United States Patent [19]

Gregerson

[11] Patent Number: 5,758,342
[45] Date of Patent: May 26, 1998

[54] CLIENT SERVER BASED MULTI-PROCESSOR FILE SYSTEM WHEREIN CLIENT FILES WRITTEN TO BY A CLIENT PROCESSOR ARE INVISIBLE TO THE SERVER

[75] Inventor: James Charles Gregerson, Hyde Park, N.Y.

[73] Assignee: International Business Machines Corporation, Armonk, N.Y.

[21] Appl. No.: 376,710

[22] Filed: Jan. 23, 1995

[51] Int. Cl.$^6$ .................................................. G06F 17/30
[52] U.S. Cl. .............................. 707/10; 707/8; 707/201; 395/200.49
[58] Field of Search ....................... 395/600, 610, 395/200.01, 200.03, 608, 617, 200.33, 200.49; 707/10, 8, 201

[56] References Cited

U.S. PATENT DOCUMENTS

| | | | |
|---|---|---|---|
| 5,008,814 | 4/1991 | Mathur | 395/200.1 |
| 5,247,670 | 9/1993 | Matsunaga | 395/200.09 |
| 5,452,448 | 9/1995 | Sakuraba et al. | 707/201 |
| 5,490,270 | 2/1996 | Devarakonda et al. | 707/201 |
| 5,566,331 | 10/1996 | Irwin, Jr. et al. | 707/10 |

OTHER PUBLICATIONS

Harjinder S. Sandhu et al., "Cluster-Based File Replication in Large-Scale Distributed Systems",Proceedings of the International Conference on Measurement and Modeling of Computer Systems,Newport, Rhode Island, Jun. 1-5 1992, vol. 20-01, Jun. 11, 1992.

"VM/ESA CMS Shared File System", R. L. Stone et al., IBM Systems Journal 30, No. 1, 1991, pp. 52-71.

"Distributed File Management Techniques Based on an Autonomous Decentralized System Concept", M. Orimo et al., Computer Communications 16, No. 5, May 1993, pp. 298-304.

Cluster-Based File Replication in Large-Scale Distributed Systems, H. Sandhu et al., Performance Evaluation Review, vol. 20, No. 1, Jun., 1992, pp. 91-102.

*Primary Examiner*—Thomas G. Black
*Assistant Examiner*—Greta L. Robinson
*Attorney, Agent, or Firm*—Floyd A. Gonzalez

[57] ABSTRACT

A distributed file system for a multi-processor system having multiple nodes, each node having a client processor and a client disk. The nodes are connected to a communications fabric for passing files between the nodes. One of the nodes acts as a server for passing files from the server to any of the other nodes. When a client processor reads a file on its client disk, the client processor obtains the server copy of the file and installs it on the client disk if the server copy of the file is more current, before the read operation. Provision is also made for atomically providing upgrades of application files to the client disks. When the client processor writes to a file, it sets a write flag in the file so that the file thus written to by the client processor is invisible to file operations from the server and the other nodes. The disclosed file system is particularly useful for systems administration of a multi-processor system having a single point of systems software install.

26 Claims, 8 Drawing Sheets

CLIENT SERVER BASED MULTI-PROCESSOR FILE SYSTEM WHEREIN CLIENT FILES WRITTEN TO BY A CLIENT PROCESSOR ARE INVISIBLE TO THE SERVER

The present invention is related to a distributed file system in a multi-processor system, and is more particularly related to a distributed file system having a server for passing files from the server to processors in the system.

Distributed file systems are known wherein files are passed from a server to client processors in a multi-processor system. File systems are also known wherein any changes made to a copy of the file at a client processor are sent from the client processor back to the server to maintain coherency of the file copies. Two such file passing systems are Network File System (NFS) available from Sun Microsystems, Inc. and Andrew File System (AFS) available from Transarc Inc. of Pittsburgh, Pa.

In those multi-processor systems wherein each processor has its own operating system, a complete operating system must be added to each processor at boot time. Such concurrent boot time, for example, on multiple dataless workstations can be painfully slow, and expensive to fix.

SUMMARY OF THE INVENTION

The present invention includes a distributed file system for a multi-processor system having multiple nodes, each node having a client processor and a client disk. The nodes are connected to a communications fabric for passing files between the nodes. One of the nodes acts as a server for passing files from the server to any of the other nodes. When a client processor reads a file on its client disk, the client processor obtains the most current copy of the file and installs it on the client disk before the read operation. When the client processor writes to a file, it sets a write flag for the file so that the file thus written to by the client processor is invisible to file operations from the server and other nodes.

It is a primary object of the present invention to provide a client/server based file system that makes client files written to by a client processor become invisible to file operations from the server and other nodes.

It is another object of the present invention to provide a client/server based file system that obtains a copy of the file from the server if the server copy is more current than the client copy before reading a client file.

It is another object of the invention to provide for pinning client files in a client/server based file system having an aging scheme wherein aged out client files are deleted by the client to make room for new client files wherein the pinned client files will not be allowed to be aged out by the aging scheme.

It is another object of the invention to provide a client/server based file system wherein the server resets flags at the client nodes for controlling client file operations.

It is another object of the invention to provide a client/server based file system wherein the files contain one of more pages of data, and the file operations by the server is done on a page basis.

It is another object of the invention to provide for a single point software install of operating system software in a multi-processor system wherein operating system software is installed on the server and operating system files are sent to client nodes as needed.

The foregoing and other objects, features and advantages of the invention will be apparent from the following more particular description of the preferred embodiment of the invention as illustrated in the drawings.

DESCRIPTION OF THE PREFERRED EMBODIMENT

Figure 1:
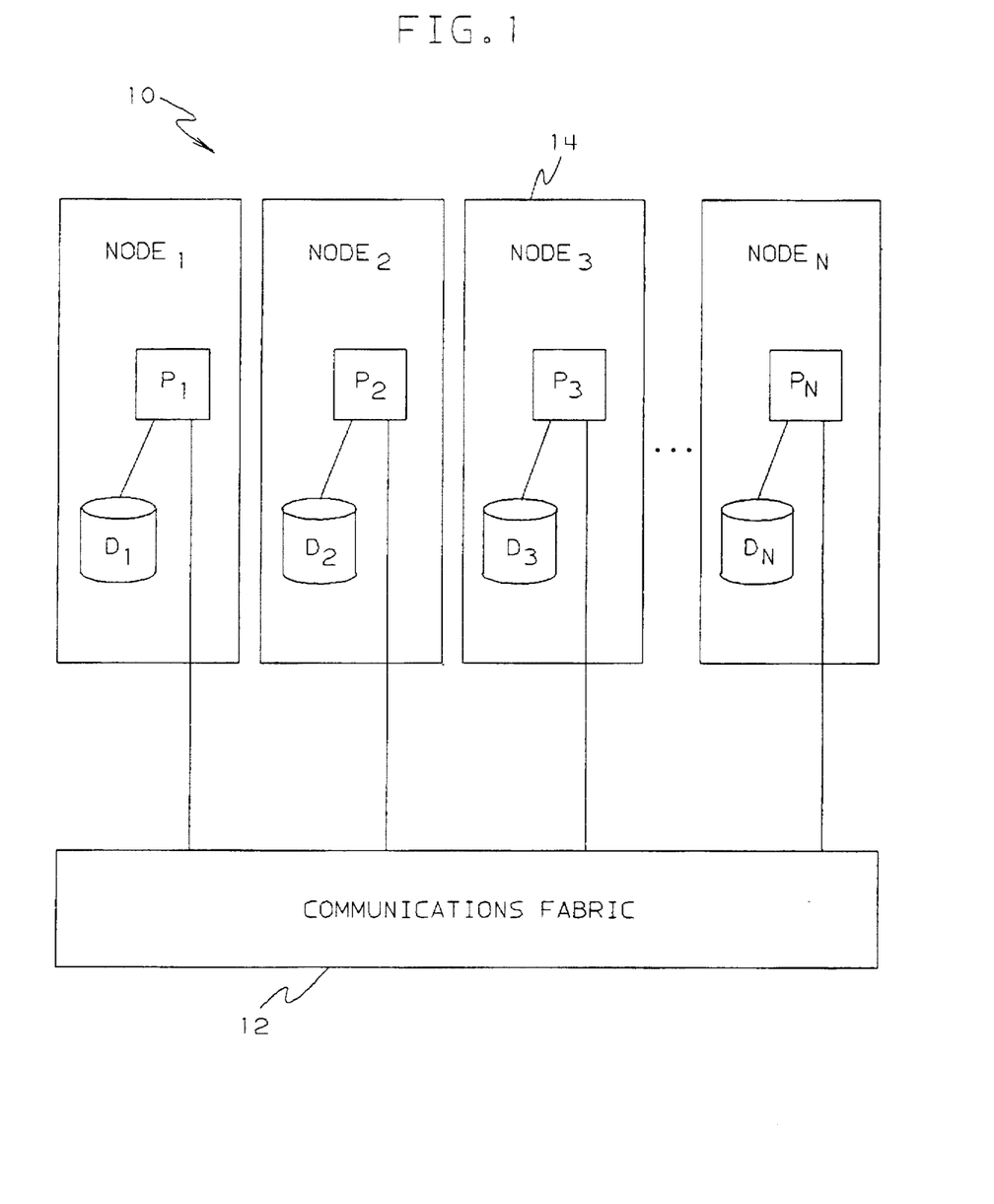
FIG. 1 is a schematic diagram of the file system network of the present invention having a plurality of nodes connected by a communications fabric, wherein each node has a client processor and a client disk storage unit.

FIG. 1 is a schematic diagram of system of the present invention 10 and includes a plurality of nodes $Node_1$ through $Node_N$. Each node includes a client processor, one of $P_1$ through $P_N$, and a client disk storage device, one of $D_1$ through $D_N$. The nodes are connected by a communications fabric 12 which may be a local area network (LAN), a switch, or both. Such a system may be an SP2 system sold by IBM Corp. In the present file system, one of the nodes, for instance $Node_3$, acts as a file server node 14 for passing files between the server node 14 and the other client nodes of the system 10 over the communications fabric 12. Hereafter, the server node 14 will be referred to simply as the server 14. Such distributed file systems are well known in the art, and will not be described further.

In the file system of the present invention, each client node includes a program such that the client processor $P_X$ may perform operations on a file on its client disk $D_X$. These operations include read, write, create and delete operations.

The client processor and client disk, referred to hereinafter as $P_X$ and $D_X$, will be understood to refer to any of the processors $P_1$ through $P_N$ and the corresponding disks $D_1$ through $D_N$, respectively. When the client file is written to, it is flagged such that the client file becomes invisible to file operations from the server 14 and the other nodes. Also, in the present invention, when a client processor $P_X$ wishes to read a file on its client disk $D_X$, a check is made to determine if the file copy at the server 14 is more current than the copy on the client disk $D_X$. If it is, the server copy of the file is passed by the distributed file system to the client disk $D_X$ before a read operation is performed. The determination of which file is more current may be done in several ways. One way to make this determination is to compare a time stamp on the server file with a time stamp on the client file, and use the file with the latest time stamp. Another way is to use an install bit or flag on the file on the client disk D which is set active when the file on the server 14 is more current than the file on the client disk D. Flag and bit are used interchangeably herein, but it will be understood that a flag may consist of one or more bits, as desired. The flags herein may contain a validating scheme, if desired, to validate that the flag was not inadvertently changed from one state to another through error.

The client disk file will always by used as long as the install bit is inactive. If a new or later version of the file is installed on the server 14, a program on the server 14 will search each client disk $D_1-D_N$ for copies of the file, and reset the install bit of each client copy to active. When the client processor $P_X$ then attempts to read the client file, it will find that the install bit is active, which indicates that the copy of the file on the server 14 is more current and should be passed over the communications fabric 12 to the client disk before the file is used.

Each client processor $P_X$ includes aging logic to age out client files on the client disk $D_X$ to make room for new client files. When a new client file is to be added to the client disk $D_X$, aging logic is used to determine the aged out file, and that file is deleted. Each client processor has the ability to pin a read-only client file to a client disk $D_X$ such that the pinned file will not be aged out by the client processor $P_X$ in the aging logic.

Figure 2:
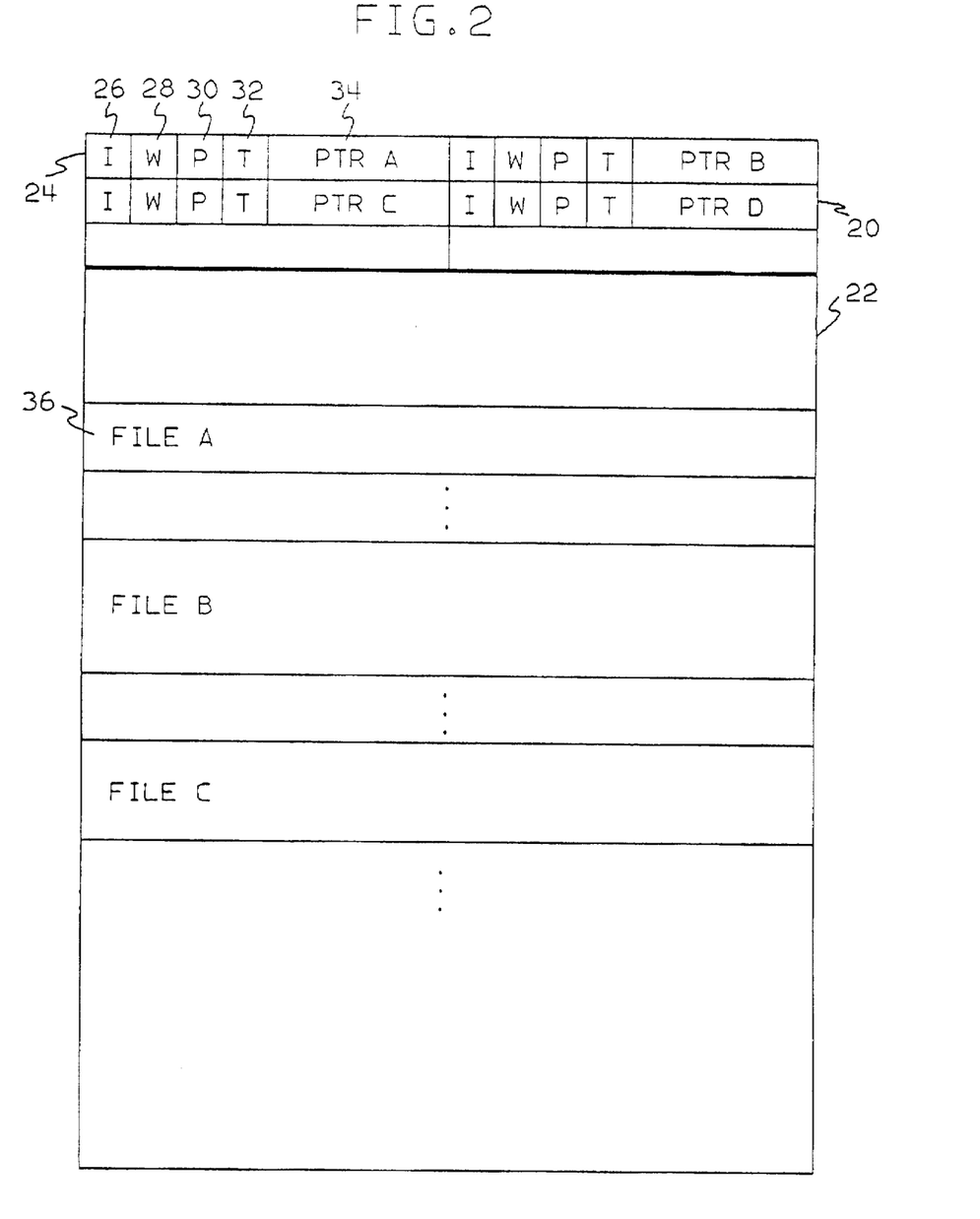
FIG. 2 is a diagrammatic representation of the contents of a client disk of the network of FIG. 1.

FIG. 2 is a diagrammatic representation of the contents of a client disk $D_X$, and includes a directory portion 20 and a data portion 22. The directory portion 20 includes a control record 24 for each of the files having data stored in the data portion 22. Each control record 24 includes an install bit 26, a write bit 28, a pin bit 30, a time stamp 32, and a pointer 34. The install bit is optional, and may be used to determine if the file is the most current copy. When the file is first written to the client disk $D_X$, its install bit 26 is reset as inactive. When the client processor $P_X$ accesses the client file on its client disk $D_X$ for a read operation, as discussed herein, the state of the install bit 26 of the file is interrogated. If the install bit 26 is inactive, the client file will be read. If the install bit 26 is active, the copy of the file in the server 14 will be transferred over the communications fabric 12 to the client disk $D_X$ before the file is read. The write bit 28 is used to determine if the file is to be visible to the server 14 in server or other client node operations on the client files at this node. If the write bit 28 is active, all operations on the client file by the server 14 or the other nodes will be prevented. The write bit 28 is usually set active by the client processor $P_X$ writing to the file. The pin bit 30 is used to override aging logic (to be explained) such that the pinned file will not be aged out by the aging logic, and thus is pinned to the client disk $D_X$. The time stamp 32 may be used instead of the install bit to determine which copy of the file is most current. If the time stamp is used, a message must be sent to the server 14 each time the client file is read and the time stamp of the copy of the file in the server 14 must be fetched to make the most current determination. Thus, the use of the install bit is more efficient if the file is read often. However, if the install bit is used, each time a more current copy of the file is installed on the server 14, each client disk $D_1-D_N$ must be polled and the install bit 26 of each copy of the file must be set to the active state. Thus, in those cases where the files are not read very often and it is desirable to install new files on the server 14 quickly, the use of the time stamp to make the most current determination might be more efficient. The control record 24 also includes a pointer 34 which points to the data 36 in the data portion 22 for this file. The use of such directories 20 and pointers 34 is well known in the art, and will not be discussed further.

Figure 3:
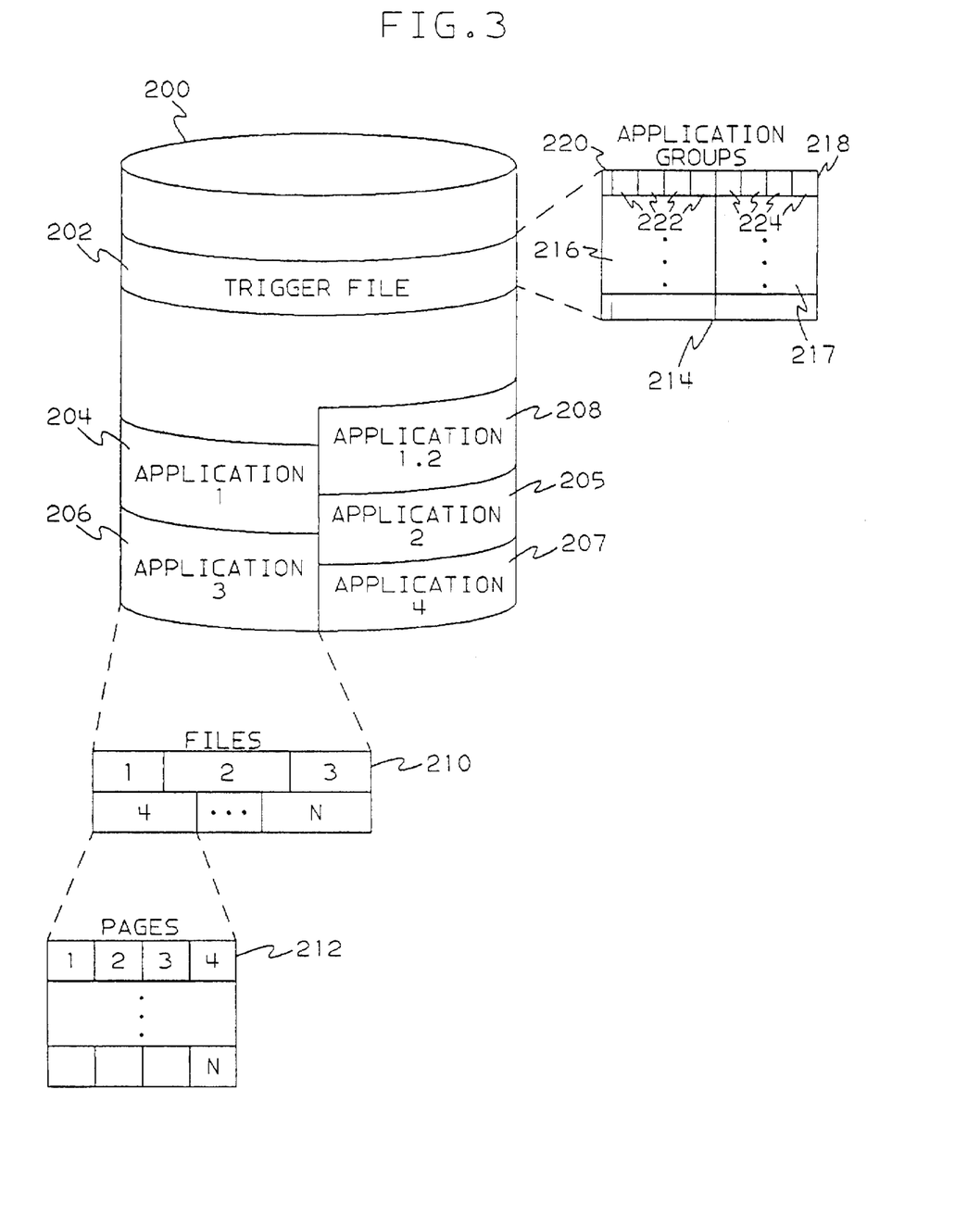
FIG. 3 is a logical view of the server disk of the network of FIG. 1.

FIG. 3 is a logical volume view of the server disk of the server 14. The server disk 200 also includes a directory portion and a data portion, as explained in connecting with FIG. 2, however only the data portion is shown for clarity. The data file of the server disk 200 includes a trigger file 202 which is used to pass to the clients, later released or higher versions of files in connection with read and write operations of client disks, and will be more fully explained in connection with FIGS. 4 and 5. The triggering mechanism may require a node partition (a domain) point to an updated release of software. The data files on the server disk 200 are divided into applications such as application 1 (204), application 2 (205), application 3 (206), application 4 (207), and application 1.2 (208). As shown in 210, each application contains 1 or more files, and as shown at 212, each file contains a plurality of pages. The files may be of different sizes, depending on the contents of each file. However, as is well understood in the art, the pages 212 are all of equal size. The size of the pages is chosen as is convenient for transmission and storage, as is well known.

As shown at 214, the trigger file 202 has multiple records, the first of which is shown at 218, each record representing an application. Each record in the trigger file 202 is divided into two portions, a first portion 216 for an older or lower level, and a second portion 217 for newer or higher level. Each record 218 has a trigger bit 220, one or more pointers 222 in the first portion 216 and one or more pointers 224 in the second portion 217. Each of the pointers 222 points to the location of the files in the lower level of the application represented by the record 218, and each of the pointers 224 points to the location of the files in the upper level of the application represented by the record 218. For instance, if the record 218 represents the application 1 (204) and its higher version 1.2 (208), the first portion 216 would contain pointers 222 to the files in application 204 and the second portion 217 would contain pointers 224 pointing to file in the application file 208. When the trigger bit 220 is not active, the pointers 222 would be used to obtain application files from 204, and when the trigger bit 220 is active, the pointers 224 would be used to obtain application files from 208. When an application is first loaded onto the server disk 200, a record is assigned to the application in the trigger file 202, the trigger bit for the assigned record is reset inactive, and pointers to the files in the application are loaded into pointers 222. It will be understood that when a system administrator wishes to upgrade an application on the server disk 200 to a higher version, pointers to the higher version application files may be loaded into pointers 224 for the record in the trigger file 202 representing the application to be upgraded. All of the install bits for affected files on the client disks $D_1-D_N$ are then set to active in a server operation as discussed in connection with FIG. 8. The system administrator then changes the trigger bit 220 to active. It will be understood that this provides that the operation is done atomically such that all of the files in a particular application to be used by the clients are changed at one time from a lower version to a higher version such that mixed level operation during the install process is avoided. As will be discussed in connection with read and write operations by a client, if the trigger bit for an application is inactive, the lower versions of the application files will be used. It will also be understood that the system administrator may switch from a higher lever application to a lower lever application by simply resetting the trigger bit 220 to its inactive state. Back releases of code mixes can be saved, and their use may restored by resetting their corresponding the trigger bit to inactive to use the back release as described. In a similar way, multiple upgrades using multiple trigger bits may be provided. It will be understood that the portions 216 and 217 may be separate directories rather than a trigger file 202.

Figure 4:
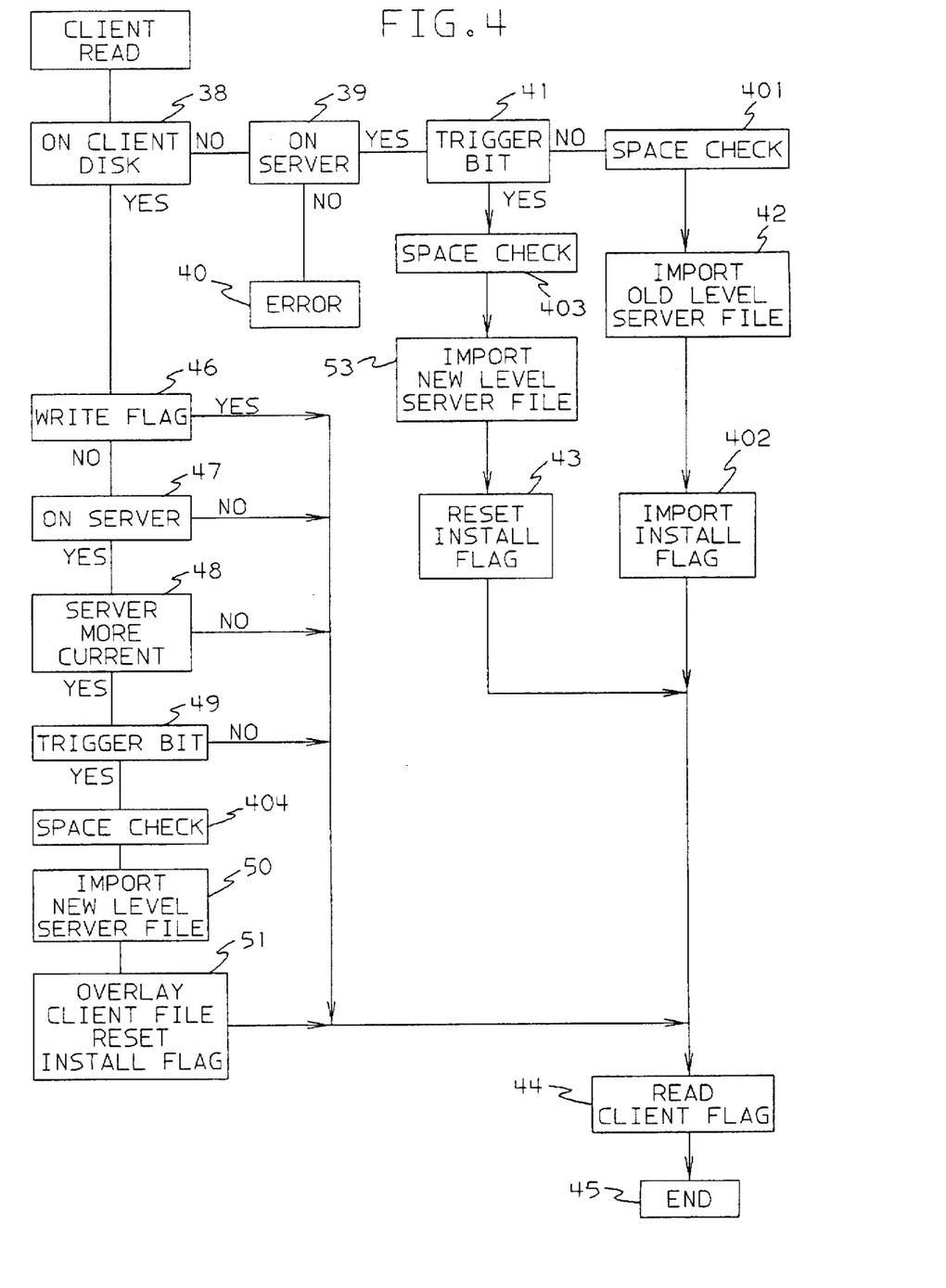
FIG. 4 is a flowchart of a read operation by a client processor of a client disk of the network of FIG. 1.

FIG. 4 is a flow chart of a read operation by a client processor $P_x$ of a file on its client disk $D_x$. At 38 the directory portion 20 is searched to determine if the desired file is present on the client disk $D_x$. If the check at 38 is no, a check is made at 39 to determine if the desired file is on the server 14. If the check at 39 is no, an error is signaled at 40. If the check at 39 is yes, a check is made 41 to determine if the trigger bit for the file on the server is active. If the trigger bit at 41 is not active, a space check is made at 401 to determine if there is sufficient room to import a file to the client file $D_x$. The space check will be discussed in connection with FIG. 6. After the space check at 401, the old level of the server file is imported at 42 as the client file, the install flag from the directory of the server is imported at 402, the client file is read at 44, and the operation ends at 45. The importation of the install flag from the server directory at 402 is to prevent the possibility of an old file being used when requested the first time, and then suddenly having the trigger bit set. It will be understood that importing of files herein is done using standard file passing operations of the operating system, to be discussed later. If the trigger bit at 41 is active, a space check is made at 403 to make sure there is room to import a server file, the new level of the server file is imported at 53, the install flag of the client file is reset to inactive at 43, the client file is read at 44, and the operation ends at 45. If the desired file is on the client disk at 38, the write bit is checked at 46. If the write bit is active at 46, the file is read at 44 and the operation ends at 45. If the write flag is inactive at 46, a check is made at 47 to determine if the file is on the server 14. If the file is not on the server 14, the file on the client disk $D_x$ is read at 44, and the operation ends at 45. If at 47, the file is on the server 14, the server copy is checked at 48 to see if it is more current, as previously described. If the server copy is not more current at 48, the client copy is read at 44, and the operation ends at 45. If the server copy is more current at 48, the trigger bit for the server file is checked at 49. If the trigger bit is inactive at 49, the client file is read at 44, and the operation ends at 45. If the trigger bit at 49 is active, a check is made at 404 to determine if there is sufficient room to import a server file, the new level server file is imported at 50, and overlaid over the client file and the install bit is reset inactive at 51. After 51, the new client copy is read at 44, and the operation ends at 45.

Figure 5:
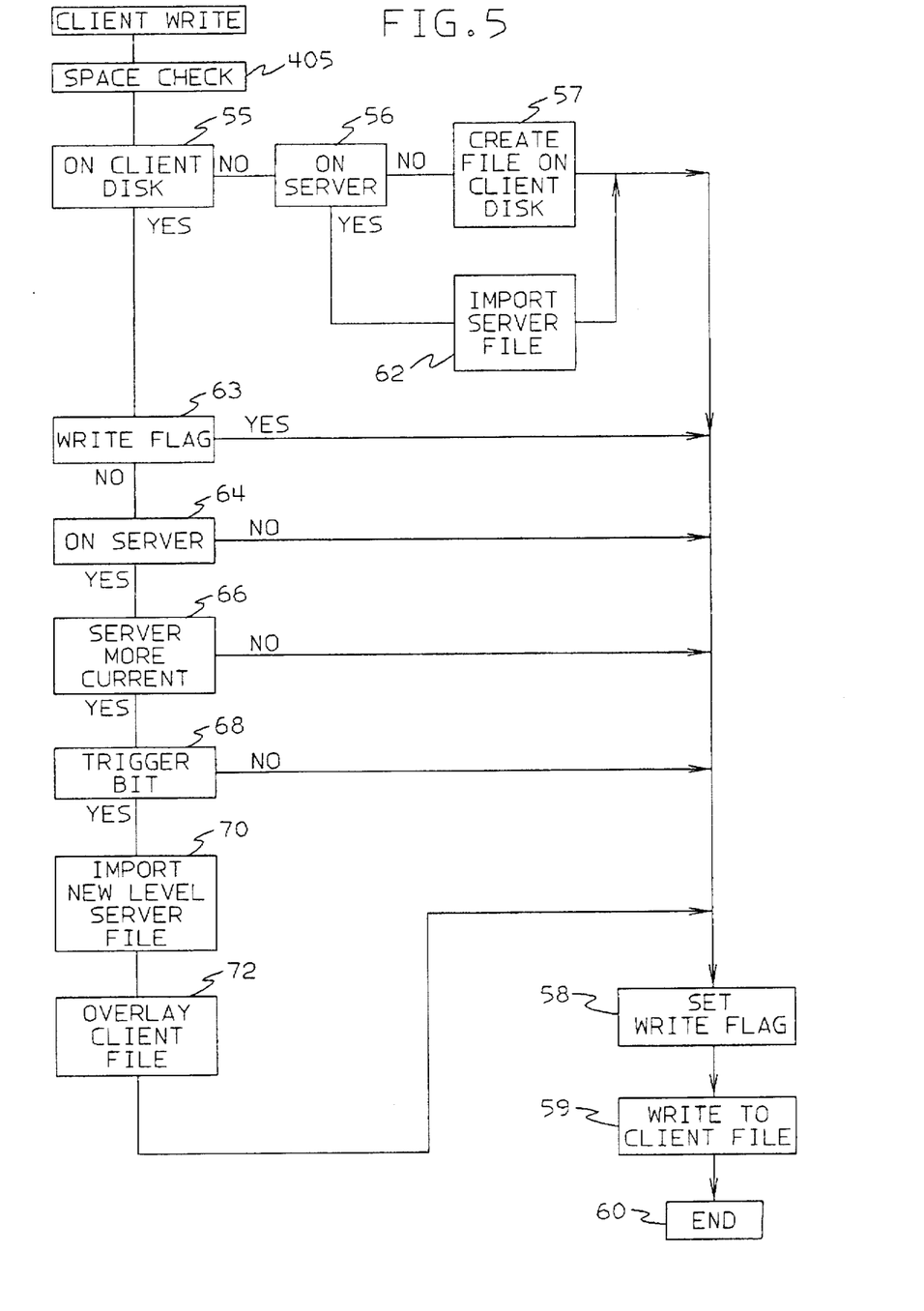
FIG. 5 is a flowchart of a write operation by a client processor to a client disk of the network of FIG. 1.

FIG. 5 is a flowchart of a write operation of a client processor $P_x$ of a file on its client disk $D_x$. A check is made at 405 to insure there is sufficient room to import a server file, if necessary. The space check is discussed in connection with FIG. 6. After the check at 405, a check is made at 55 of the directory 20 on the client disk $D_x$ to see if the file to be written to is on the client disk $D_x$. If the check at 55 is no, the check is made at 56 to see if the file is on the server 14. If the file is also not on the server 14, the file is created on the client disk $D_x$ at 57, the write flag or bit is set active at 58, the file is written to at 59, and the operation ends at 60. If the file is at the server as determined at 56, the file is imported at 62, and the operation continues at 58 as described. If the file is on the client disk $D_x$, as determined at 55, its write flag is checked at 63. If the write flag at 63 is active, the operation goes to 59 as described. It will be understood that all files that have been written to by the client processor $P_x$ are pinned to the client disk $D_x$, but that they will be invisible to the server 14 and other client nodes, as will be described. If the write flag is not active at 63, a check is made at 64 to determine if the file is on the server 14. If the file is not on the server 14, as determined at 64, the write operation goes to 59. If the file is on the server 14 at 64, a determination is made at 66 to see if the server file is more current, as previously described. If the server file is not more current at 66, the client file is written to at 59, as previously described. If the server copy is more current at 66, the trigger bit for the file is checked at 68. If the trigger bit checked at 68 is not active, the client file is written to at 59 and the operation ends at 60. If the trigger bit checked at 68 is active, the new level of the server file is imported at 70, overlays the client file at 72, the write flag for the client is set to active at 58, the client file is written to at 59, and the operation ends at 60.

Figure 6:
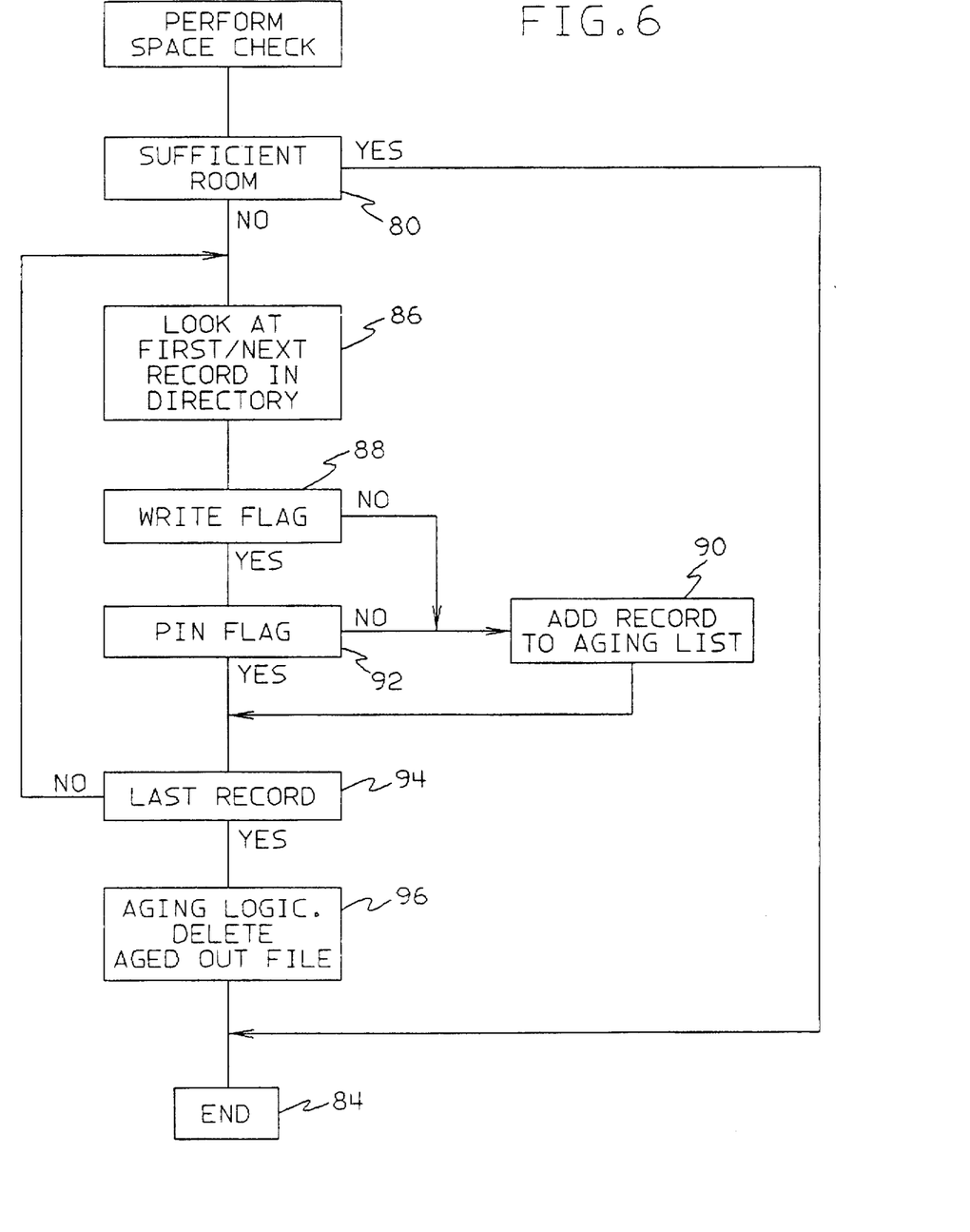
FIG. 6 is a flowchart of an operation by a client processor to check for sufficient space on the client disk before a client file is written to, imported from the server, or created on the client disk of the network of FIG. 1.

FIG. 6 is a flowchart of an operation to check for sufficient room on the client disk $D_x$ to write to a file, import a server file, or create a file on the client disk $D_x$ by its client processor $P_x$, as desired. At 80, a check is made to see if there is sufficient room on the client disk $D_x$. If there is, the operation ends at 84. If there is not sufficient room at 80, the operation goes to 86 wherein the first control record 24 in the directory 20 is looked at. A check is made a 88 to determine if the write bit of that record is active. If the write bit is not active, the record is added to an aging list at 90. If the write bit is active at 88, a check is made at 92 to determine if the pin bit is active. If the pin bit is not active, the record is added to the aging list at 90. If the pin bit is active at 92, or if the record has been added to the aging list at 90 because either the write bit or the pin bit is not active, a last record check is made at 94. If this is not the last record 24 in the directory 20, the operation returns to 86 to look at the next record. If all records have been checked, the operation performs aging logic at 96 to determine the aged out file, and the thus determined aged out file is deleted to make room for the new file to be created. One such aging logic scheme is the least recently used (LRU) logic, which is well understood in the art and will not be discussed further. After the aging logic operation and deletion of the file at 96, the operation is ended at 84.

Figure 7:
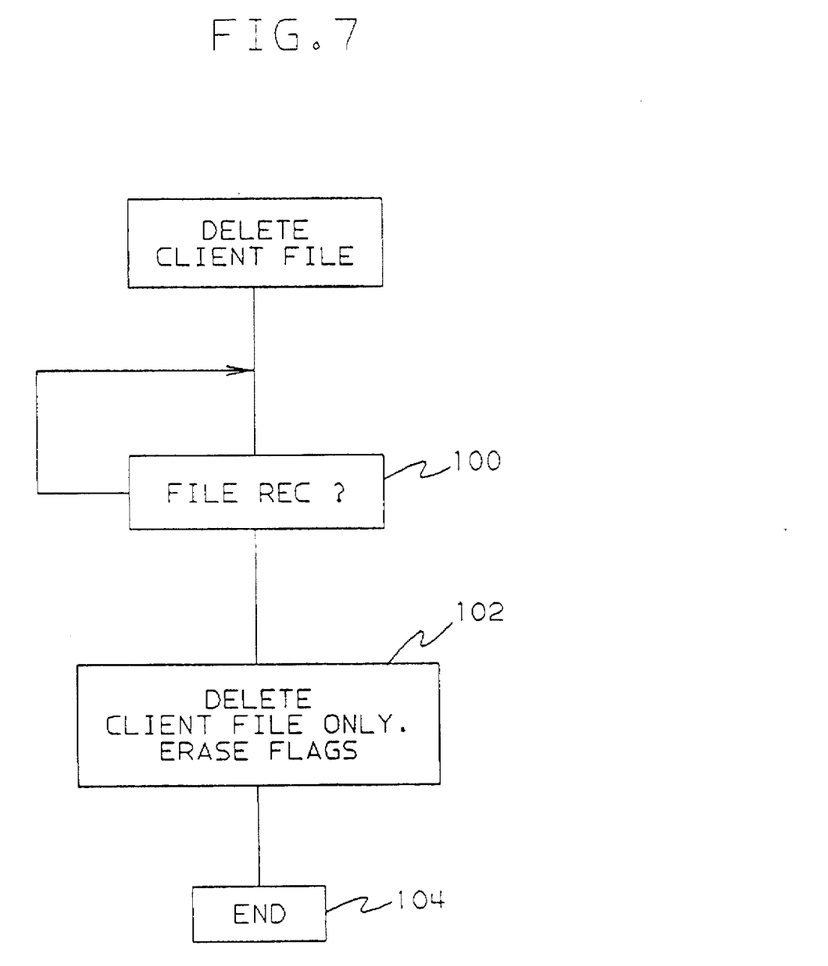
FIG. 7 is a flowchart of an operation by a client processor to delete a file from its client disk of the network of FIG. 1.

FIG. 7 is a flowchart of an operation to delete a file from the client disk $D_x$ by its client processor $P_x$. A search is made, represented as a loop at 100, to locate the file to be deleted from the client disk $D_x$. When the record is found at 100, it is deleted at 102 from the client disk $D_x$ only. It will be understood that the erasing of the client file with also erase all flags for the file and its control record from the directory 20, as shown in FIG. 2. The operation is then ended at 104.

Figure 8:
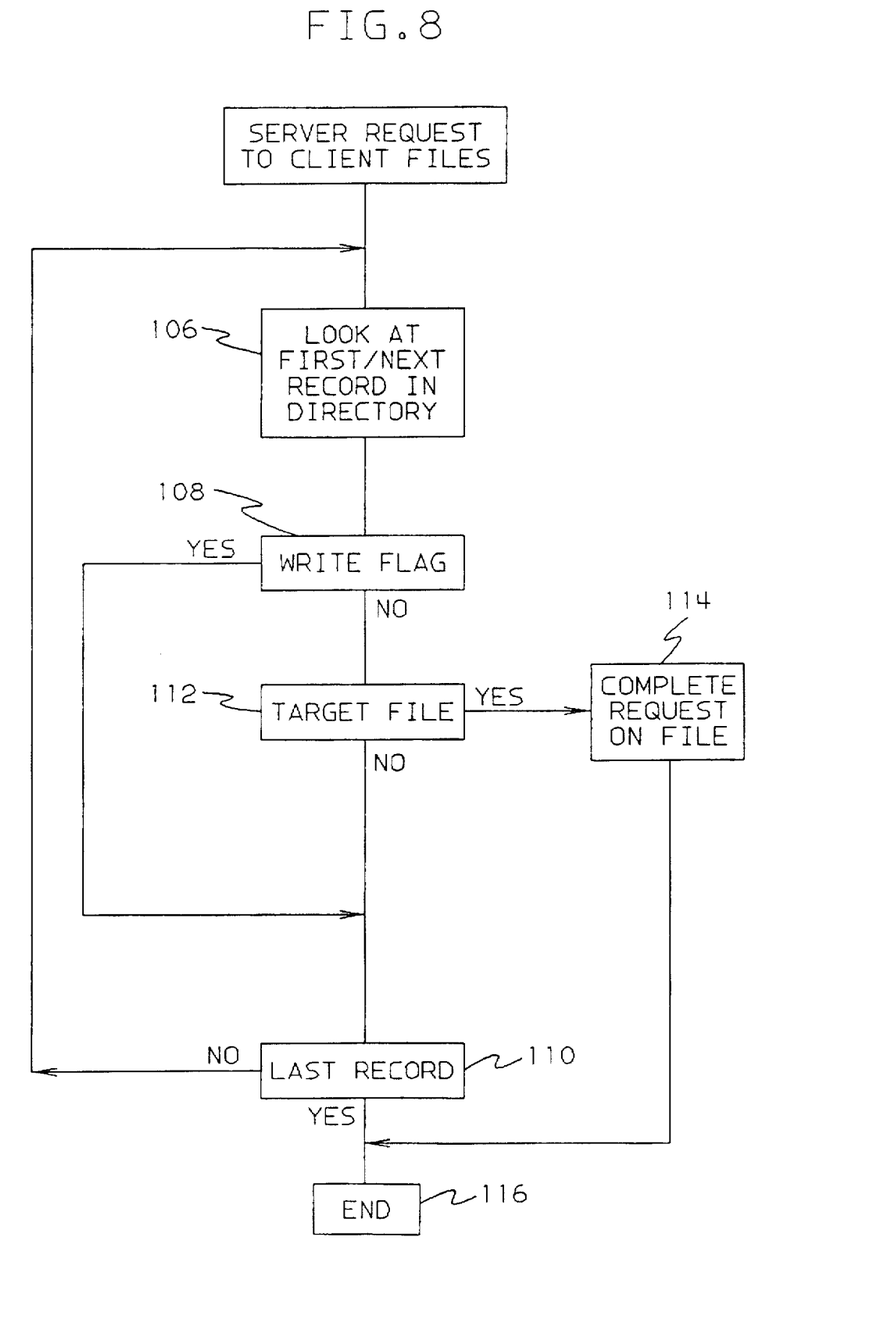
FIG. 8 is a flowchart of an operation of a file server in the network of FIG. 1 to carry out an operation on a client disk wherein flagged files on a client disk are invisible to a server operation.

FIG. 8 is a flowchart of how a server operation is carried out on the client disk $D_x$ such that a client file that has been written to by the client processor $P_x$ is invisible to the server 14. When the server 14 requests an operation on a file in the client disk $D_x$, the first record is examined at 106. A check is then made at 108 to determine if the write flag for this file is active. If the write flag at 108 is active, the operation goes to 110 to check if this is the last record in the directory. If the write flag is not active at 108, a check is made at 112 to determine if this file is a target file on which the server request is to be performed. If, for instance, the requested operation is a global operation for all files, all of the client files are target files and will be operated on by the server request except for those having an active write flag, as determined at 108. If the operation is for a specific file, the specific file is checked for at 112. If the check at 112 is no, the operation goes to 110 to check if this is the last record in the directory. If the check at 112 is yes, that is that the present file is one for which the server request is intended, the requested server operation on the file is completed at 114, and the operation goes to the end at 116. If the record is not the last at 110, the operation goes to 106 to look at the next record in the directory, and continues through the loop, as discussed above. If the record is the last record at 110, the operation ends as 116.

As previously discussed, the server operation of 114 might be a global operation, such as resetting the install bits for all files to active, in which case all records will be selected at 112. If desired, a system administrator may also globally reset flags, including write flags and/or pin flags, to inactive for some or all of the files to force the client processors to import the latest copy of the desired files from the server 14. As discussed, a specific file might be selected at 112 on a file-by-file basis to perform a server request on that specific file only, such as changing the state of one of the flags for a specific file only, or to delete a specific file only. The server operation may be to display at the server 14, all files on the client disk $D_X$. Such a request is a global request, and all files having control records 24 in the director 20 of the client disk $D_X$ will be displayed at the server except for those files whose write flag or bit 28 is in the active state. It will be understood that display operations, or other operations not reserved to the server 14, may also be performed by any client processor for the files on any other client disk or disks. If a write bit 28 is active, the associated file can only be displayed by its own client processor $P_X$.

This invention is particularly useful when the operating system of each processor $P_1$ through $P_N$ is a UNIX operating system licensed exclusively through X/Open Company Limited or the AIX operating system, the IBM implementation of the UNIX operating system available from IBM Corporation. Instead of loading the operating system on all nodes at boot time, with the present invention it is necessary to only load the operating system on the server 14, and each time an operating system file is needed by a client node, it may be fetched from the server 14 as explained. If an operating system file is personalized by being written to by a client processor, that file becomes exclusive to that client node and becomes invisible to the server 14 by making its write bit active. Also, as described, selected ones of the operating system files, or the entire operating system, may be updated with a more current release, and the most current files will be imported to the client nodes as needed. Some of the operating system files, such as those needed to reboot and to perform basic file passing operations, may be sent to the client disks by a system administrator and pinned to the client disk such that they will not age out and be replaced by the aging logic discussed. Thus, the files need to reboot the client node and perform basic file passing operations will always be present on the client disk. It will be further understood that non-operating system files may also be handled by the present file system. It will be noticed that the files processed by the present file system only move from the server 14 to the client nodes. Thus the present file system may be referred to as a uni-directional file system.

Referring to FIG. 3, one embodiment of the present file system may be based on pages 212 rather than files 210. Dataless operation can be enhanced by allowing pages to be pinned into the client disk's paging area in a manner well known in the art.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described my invention, what I claim as new, and desire to secure by Letters Patent is:

1. A file system comprising:

a plurality of nodes, each node having a client processor and a client disk for holding client files;

one of said nodes being a control node acting as a file server, the client disk of said control node being a server disk having server files corresponding to the client files;

communications fabric connected to said plurality of nodes for passing server files to said client disks; and read/write means at each node for gaining access to specific files such that the client processor at each node may read from and write to files on the client disk at that node, said read/write means having:

determining means for determining if a specific file is on that client disk, file import means for, in the event said determining means determines said specific file is not on the client disk, importing the corresponding server copy of the specific file over the communications fabric from the server disk to the client disk, write testing means for testing if said specific file determined to be on the client disk as determined by said determining means has been written to by said client processor, and preventing said file import means from importing said specific file in the event said specific file has been written to, and flagging means for flagging the client copy of the specific file with a write flag in the event that the client copy of the specific file is written to by the client processor.

2. The file system of claim 1 further comprising:

comparing means in each of said read/write means for, in the event said determining means determines said specific file is on the client disk and said write test means determines that the specific file has not been written to by the client processor, comparing whether the corresponding copy of the specific file on the server disk is more current than the specific file on the client disk and causing the file import means to import the corresponding server copy of the specific file over the communications fabric from the server disk to the client disk in the event the server file copy of the specific file is more current.

3. The file system of claim 2 wherein each file on said client disks and said server disk has a time stamp, and said comparing means compares the time stamp of said specific file on said client disk with the corresponding file on said server disk to determine if the corresponding file on said server disk is more current.

4. The file system of claim 2 wherein each file on said client disks has an install bit, said server has a server file command means for changing to an active status, the install bit of each file on the client disks whose corresponding file in the server disk has been changed to a more current version, and said comparing means compares the state of the install bit of said specific file such that if in an active state, said corresponding file on said server disk is more current.

5. The file system of claim 2 further comprising file command means at each node for performing file commands on files at the other nodes, and skip means in each read/write means for skipping client files on said client disks having a write flag during such file commands from other nodes, thereby making client files invisible to the file command means of other nodes.

6. The file system of claim 1 wherein said read/write means includes file creating means for creating a file to be written to on the client disk when the file to be written to does not exist on the client disk or the server disk.

7. The file system of claim 6 wherein said read/write means includes file deleting means to delete a file to make room on the client disk for a file being created by said file creating means.

8. The file system of claim 7 wherein said file deleting means includes aging logic for determining an aged out file to be deleted by said file creating means.

9. The file system of claim 8 wherein said aging logic uses least recently used logic.

10. The file system of claim 7 wherein said read/write means includes pinning means for pinning a file to said client disk such that said file deleting means will not delete a pinned file when making room for a file to be created by said file creating means.

11. The file system of claim 4 wherein said server disk includes:

one or more applications, each application having one or more files, at least one application having a lower version and a higher version;

trigger means for each application, said trigger means having a first state if the files to be imported for a specific application is to be from the lower version of the specific application and a second state if the files to be imported for said specific application is to be from the higher version of the specific application; and each import means includes trigger comparison means for comparing the state of the trigger means for a file being imported from said server for determining if the file is to be imported from the lower level application or the higher level application.

12. The file system of claim 1 wherein said files include one or more pages, and said file import means includes means for importing said server copy of the specific file from the server disk to the client disk one page at a time.

13. In file system including a plurality of nodes, each node having a client processor and a client disk for holding client files, one of said nodes being a control node acting as a file server, the client disk of said control node being a server disk having server files corresponding to the client files, communications fabric connected to said plurality of nodes for passing server files to said client disks, and read/write means at each node for gaining access to specific files such that the client processor at each node may read from and write to files on the client disk at that node, a method comprising the steps of:

determining if a specific file is on that client disk, in the event it is determined said specific file is not on the client disk, importing the corresponding server copy of the specific file over the communications fabric from the server disk to the client disk, testing if said specific file determined to be on the client disk has been written to by said client processor, preventing the importing of said specific file in the event said specific file has been written to, and flagging the client copy of the specific file with a write flag in the event that the client copy of the specific file is written to by the client processor.

14. The method of claim 13 further comprising:

in the event it is determined that said specific file is on the client disk and the specific file has not been written to by the client processor, comparing whether the corresponding copy of the specific file on the server disk is more current than the specific file on the client disk; and importing the corresponding server copy of the specific file over the communications fabric from the server disk to the client disk in the event the server file copy of the specific file is more current.

15. The method of claim 14 wherein each file on said client disks and said server disk has a time stamp, said method further comprising comparing the time stamp of said specific file on said client disk with the corresponding file on said server disk when determining if the corresponding file on said server disk is more current.

16. The file system of claim 14 wherein each file on said client disks has an install bit, said method further comprising changing to an active status, the install bit of each file on the client disks whose corresponding file on the server disk has been changed to a more current version, and comparing the state of the install bit of said specific file to see if it is in an active state when determining if said corresponding file on said server disk is more current.

17. The method of claim 14 further comprising performing client file operations by processors of any node on the other nodes in the file system, and making invisible to the other nodes, the client files on each client disk having a write flag which indicates the client file has been written to.

18. The method of claim 13 further comprising creating a file to be written to on the client disk when the file to be written to does not exist on the client disk or the server disk.

19. The method of claim 18 further comprising deleting a file to make room on the client disk prior to creating said file to be written to.

20. The method of claim 19 wherein file deleting step includes determining an aged out file to be deleted.

21. The method of claim 20 wherein said determining an aged out file uses least recently used logic.

22. The method of claim 19 further comprises pinning a file to said client disk such that said file deleting step will not delete a pinned file when making room for a file to be created by said file creating step.

23. The file system of claim 16 wherein said server disk includes:

one or more applications, each application having one or more files, at least one application having a lower version and a higher version;

trigger means for each application, said trigger means having a first state if the files to be imported for a specific application is to be from the lower version of the specific application and a second state if the files to be imported for said specific application is to be from the higher version of the specific application;

said method further comprising comparing the state of the trigger means for a file being imported from said server for determining if the file is to be imported from the lower level application or the higher level application.

24. A file system comprising:

a plurality of nodes, each node having a client processor and a client disk for holding client files;

one of said nodes being a control node acting as a file server, the client disk of said control node being a server disk having server files corresponding to the client files;

communications fabric connected to said plurality of nodes for passing server files to said client disks; and means at each node for making files on the client disk that have been written to by the client processor at that node invisible to said file server and the other client nodes.

25. A file system comprising:

a plurality of nodes, each node having a client processor and a client disk for holding client files;

one of said nodes being a control node acting as a file server, the client disk of said control node being a server disk having operating system files;

communications fabric connected to said plurality of nodes for passing operating system files to said client disks;

file importing means at each node for importing specific operating system files from said server disk to the client disk at that node only when that client disk needs a specific operating system file; and deleting means in said file importing means for deleting files from the client disk when there is not enough room to import a file from said server.

26. The filing system of claim 25 wherein said file importing means includes pinning means for pinning specific operating system files to said client disk such that the pinned files will not be deleted by said deleting means.

* * * * *